(12) United States Patent
Liu et al.

(10) Patent No.: US 7,767,174 B2
(45) Date of Patent: Aug. 3, 2010

(54) METHOD AND SYSTEMS FOR REMOVING MERCURY FROM COMBUSTION EXHAUST GAS

(75) Inventors: Ke Liu, Rancho Santa Margarita, CA (US); Gregg Anthony Deluga, Playa del Rey, CA (US); Vladmir M. Zamansky, Oceanside, CA (US); Vitali Victor Lissianski, San Juan Capistrano, CA (US); Parag Prakash Kulkarni, Tustin, CA (US)

(73) Assignee: General Electric Company, Schenectady, NY (US)

( * ) Notice: Subject to any disclaimer, the term of this patent is extended or adjusted under 35 U.S.C. 154(b) by 989 days.

(21) Appl. No.: 11/532,733

(22) Filed: Sep. 18, 2006

(65) Prior Publication Data

US 2008/0069749 A1     Mar. 20, 2008

(51) Int. Cl.
*B01D 53/56* (2006.01)
*B01D 53/64* (2006.01)

(52) U.S. Cl. .................................. 423/210; 423/239.1

(58) Field of Classification Search ............... 423/210, 423/239.1
See application file for complete search history.

(56) References Cited

U.S. PATENT DOCUMENTS

| | | | |
|---|---|---|---|
| 3,849,267 A | 11/1974 | Hilgen et al. | |
| 4,273,747 A | 6/1981 | Rasmussen | |
| 5,507,238 A | 4/1996 | Knowles | |
| 5,900,042 A | 5/1999 | Mendelsohn et al. | |
| 6,168,709 B1 | 1/2001 | Etter | |
| 6,230,480 B1 | 5/2001 | Rollins, III | |
| 6,447,470 B2 | 9/2002 | Bodenschatz et al. | |
| 6,494,045 B2 | 12/2002 | Rollins, III | |
| 6,606,848 B1 | 8/2003 | Rollins, III | |
| 6,638,485 B1 | 10/2003 | Iida et al. | |
| 6,678,358 B2 | 1/2004 | Langsenkamp et al. | |
| 6,790,420 B2 | 9/2004 | Breen et al. | |
| 6,792,759 B2 | 9/2004 | Rollins, III | |
| 6,855,859 B2 | 2/2005 | Nolan et al. | |
| 6,907,831 B1 | 6/2005 | Rising | |
| 6,935,251 B2 | 8/2005 | Marin et al. | |
| 6,960,329 B2 | 11/2005 | Sellakumar | |
| 6,974,565 B2 | 12/2005 | Pahlman et al. | |
| 7,033,548 B2 | 4/2006 | Pahlman et al. | |
| 7,622,092 B2 * | 11/2009 | Honjo et al. | 423/210 |
| 2003/0235525 A1 | 12/2003 | Honjo et al. | |
| 2004/0253158 A1 * | 12/2004 | Honjo et al. | 423/210 |
| 2005/0147549 A1 | 7/2005 | Lissianski et al. | |
| 2006/0120934 A1 | 6/2006 | Lanier et al. | |
| 2006/0239877 A1 * | 10/2006 | Johnson et al. | 423/210 |
| 2007/0116616 A1 | 5/2007 | Taylor | |
| 2007/0154374 A1 * | 7/2007 | Johnson et al. | 423/210 |
| 2007/0202020 A1 | 8/2007 | Honjo et al. | |
| 2008/0011158 A1 | 1/2008 | Barger et al. | |

FOREIGN PATENT DOCUMENTS

EP          1 800 734 A1     6/2007
WO         03/076051 A1     9/2003

OTHER PUBLICATIONS

GB Search Report, App. No. GB0717884.1, Jan. 4, 2008.
Jarvis, et al., LoTOx Process Flexibility and Multi-Pollutant Control Capability, Paper No. 147 (Combined Power Plant Air Pollutant Control Mega Symposium, Washington, D.C., May 2003).

* cited by examiner

Primary Examiner—Timothy C Vanoy
(74) Attorney, Agent, or Firm—Armstrong Teasdale LLP

(57) ABSTRACT

A method for facilitating reducing mercury in a fluid stream using a catalytic bed assembly including at least a first catalytic bed. The method includes receiving a flow of fluid including mercury at the catalytic bed assembly; injecting a flow of a compound including ammonia and a first mercury oxidizer upstream of the first catalytic bed; and oxidizing the mercury using the mercury oxidizer and the catalytic bed assembly.

13 Claims, 2 Drawing Sheets

METHOD AND SYSTEMS FOR REMOVING MERCURY FROM COMBUSTION EXHAUST GAS

BACKGROUND OF THE INVENTION

This invention relates generally to combustion devices and, more particularly, to emission control systems for combustion devices.

During a typical combustion process within a furnace or boiler, for example, a flow of combustion exhaust gas is produced. The combustion exhaust gas typically contains combustion products including, without limitation, carbon dioxide, carbon monoxide, water, hydrogen, nitrogen and mercury generated as a direct result of combusting solid and/or liquid fuels. Before the combustion exhaust gas is emitted into the atmosphere, combustion products, such as mercury (Hg) emissions and oxides of nitrogen ($NO_x$), are typically removed according to regulatory and/or other environmental standards and procedures that include, but are not limited to, United States (U.S.) and State-specific Environmental Protection Agencies' (EPA) requirements, local ordinances, industry standards and corporate policies.

Many known combustion exhaust gas streams include Hg in the elemental form of $Hg^0$ at elevated temperatures typically in excess of 538 degrees Celsius (° C.) (1000 degrees Fahrenheit (° F.)). One known method of $Hg^0$ removal includes oxidation of at least a portion of the $Hg^0$ at temperatures below 538° C. (1000° F.) using a chlorine-(Cl) containing species or other oxidizing agents, thereby forming at least some $Hg^{+2}$. Such oxidizing reactions typically form at least some $HgCl_2$. Generally, $Hg^{+2}$ is more reactive than $Hg^0$ and, therefore, $Hg^{+2}$ is more easily removed from the combustion exhaust gas stream than $Hg^0$. The efficiency and effectiveness of Hg removal from a combustion exhaust gas stream depend on the methods and apparatus for facilitating the formation, concentration and distribution of $Hg^{+2}$ within the combustion exhaust gas stream as well as the integration of such Hg removal methods and apparatus to existing combustion exhaust gas methods and apparatus.

BRIEF DESCRIPTION OF THE INVENTION

In one aspect, a method is provided for reducing mercury in a fluid stream using at least a first catalytic bed assembly. The method includes receiving a flow of fluid including mercury at the catalytic bed assembly, injecting a flow of a compound including ammonia and a first mercury oxidizer upstream of the catalytic bed assembly, and oxidizing the mercury using the mercury oxidizer and the catalytic bed assembly.

In another aspect, a catalytic bed assembly is provided. The assembly includes a selective catalyst reduction (SCR) catalytic bed configured to facilitate at least one of a reduction reaction of nitrogen oxides and an oxidation reaction of mercury. The assembly also includes a first injection port positioned upstream of the SCR catalytic bed. The injection port is configured to inject a flow of mercury oxidizer.

In another aspect, a combustion zone exhaust system is provided. The system includes a combustion chamber configured to combust materials including mercury such that mercury exits the combustion chamber in a flow of exhaust. The system also includes a selective catalyst reduction (SCR) catalytic bed configured to facilitate at least one of a reduction reaction of nitrogen oxides ($NO_x$) and an oxidation reaction of mercury. The system further includes a first injection port positioned upstream of the SCR catalytic bed that is configured to inject a flow of mercury oxidizer.

DETAILED DESCRIPTION OF THE INVENTION

An exemplary embodiment of the present invention provides a method and system for continuously removing and reducing compounds, such as mercury (Hg) emissions and oxides of nitrogen ($NO_x$) from a flow of combustion exhaust gas produced during a combustion process within a furnace or boiler, for example. The flow of combustion exhaust gas having combustion products includes, without limitation, carbon dioxide, carbon monoxide, water, hydrogen, nitrogen and mercury. This combustion gas is a direct result of combusting solid and/or liquid fuels. Before the combustion exhaust gas is emitted into the atmosphere, combustion products, such as Hg and $NO_x$ emissions, are typically removed according to regulatory and/or other environmental standards and procedures.

The method is described below in reference to its application in connection with and operation of a system for continuously removing mercury and oxides of $NO_x$ from a supply of combustion exhaust gas generated during a combustion process. However, it will be obvious to those skilled in the art and guided by the teachings herein provided that the methods and systems described herein are likewise applicable to any combustion device including, without limitation, boilers and heaters, and may be applied to systems consuming fuels such as coal, oil or any solid, liquid or gaseous fuel.

As used herein, references to "particulate matter" are to be understood to refer to particulate matter contained within the combustion gas. The particulate matter includes particles of matter including, without limitation, fly ash and carbon, contained within the combustion gas as a naturally occurring product of a combustion process, and may also include externally-introduced matter including, without limitation, at least one of active carbon particles and additional fly ash, recirculated or injected into the particulate matter contained within the combustion gas.

Figure 1:
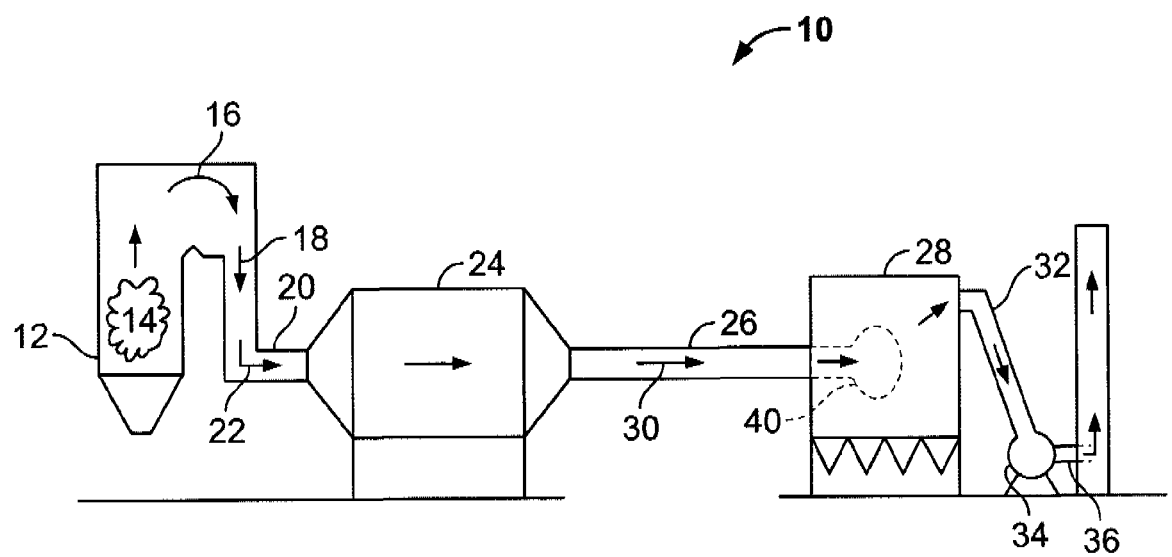
FIG. 1 is a schematic view of a exemplary power plant system.

FIG. 1 is a schematic view of an exemplary power plant system 10 according to one embodiment of the present invention. In the exemplary embodiment, system 10 includes a combustion device assembly 12 that combusts at least one fuel, such as but not limited to coal, oil, or any solid, liquid or gaseous fuels in which a supply of combustion gases is produced. Combustion device 12 includes a combustion zone 14 wherein a fuel-air mixture is combusted generating a high temperature stream of combustion gas 16. Combustion device 12 is coupled in flow communication to an exhaust duct 18 configured to channel combustion gas 14 from combustion device 12. Exhaust duct 18 is coupled to a gas outlet duct 20 in flow communication to channel high temperature combustion gas 16 through exhaust duct 18 and gas outlet duct 20 resulting in combustion exhaust gas 22 being discharged downstream.

More specifically, combustion exhaust gas 22 is contained in gas outlet duct 20, or other suitable connection, which directs the combustion exhaust gas 16 through system 10. Gas outlet duct 20 generally provides flow communication between components of system 10 through a passage in which combustion exhaust gas 22 is channeled. It is apparent to those skilled in the art and guided by the teachings herein provided that gas outlet duct 20 may have any suitable size, shape and/or diameter to accommodate any supply of combustion gas produced during the described combustion process.

Gas outlet duct 20 is coupled in flow communication to catalytic bed 24 which is coupled in flow communication to a conditioned gas exit duct 26. Conditioned gas exit duct 26 is coupled in flow communication to an electrostatic precipitator (ESP) 28, such that conditioned combustion exhaust gas 30 is channeled to ESP 28.

In the exemplary embodiment, ESP 28 is coupled in flow communication to a precipitator outlet duct 32. Precipitator outlet duct 32 channels exit gas to an exhaust or induced type fan system 34 that is coupled in flow communication with fan outlet duct 36. Fan outlet duct 36 facilitates channeling fan system 34 discharge gas to a stack or chimney 38. Stack 38 discharges the outlet gases into the atmosphere.

In operation, system 10 facilitates continuously removing and reducing hazardous and/or toxic compounds, such as mercury emissions and oxides of nitrogen ($NO_x$) from high temperature combustion gas 16 stream produced during combustion within combustion device 12.

Combustion exhaust gas 22 flow is directed through gas outlet duct 20 and combustion device 12 such that materials including mercury are combusted prior to exiting combustion zone 14 with exhaust gases 22. For example, combustion gases may include combustible products such as, but not limited to carbon monoxide, water, hydrogen, nitrogen and mercury generated during the combustion of fuels. Combustion exhaust gases 22 are then channeled to catalytic bed 24. In the exemplary embodiment, catalytic bed 24 facilitates reducing an amount of NOx contained in the combustion gas. Conditioned combustion exhaust gas 30 is discharged from catalytic bed 24 through conditioned gas exit duct 26 to ESP 28.

In the embodiment shown in FIG. 1, ESP 28 is positioned downstream of catalytic bed 24 to facilitate reducing particulate matter contained within the combustion gas system. Specifically, a portion of the particulate matter contained within the treated combustion gas is removed or precipitated out of the combustion gas as the combustion gases are channeled through an ESP region 40. The combustion gases exit ESP 28 as a filtered exhaust gas flow stream.

In the exemplary embodiment, as a result of ESP 28 a portion of particulate matter contained within the combustion gas system are reduced. For example, within ESP 28, a portion of particulate matter contained within the combustion gases is removed or precipitated out of the combustion gas such as, but not limited to, a quantity of particulate-bonded mercury. For example, a portion of liquid phase mercury is absorbed by the particulate matter and removed with the particulate matter. However, elemental mercury and ionic mercury in a gas phase, e.g., mercury vapor, may remain in the combustion gases exiting ESP 28. In operation, such particulate matter may include fly ash produced as a natural product of the combustion process that can be introduced into the combustion gas downstream from combustion device 12.

Figure 2:
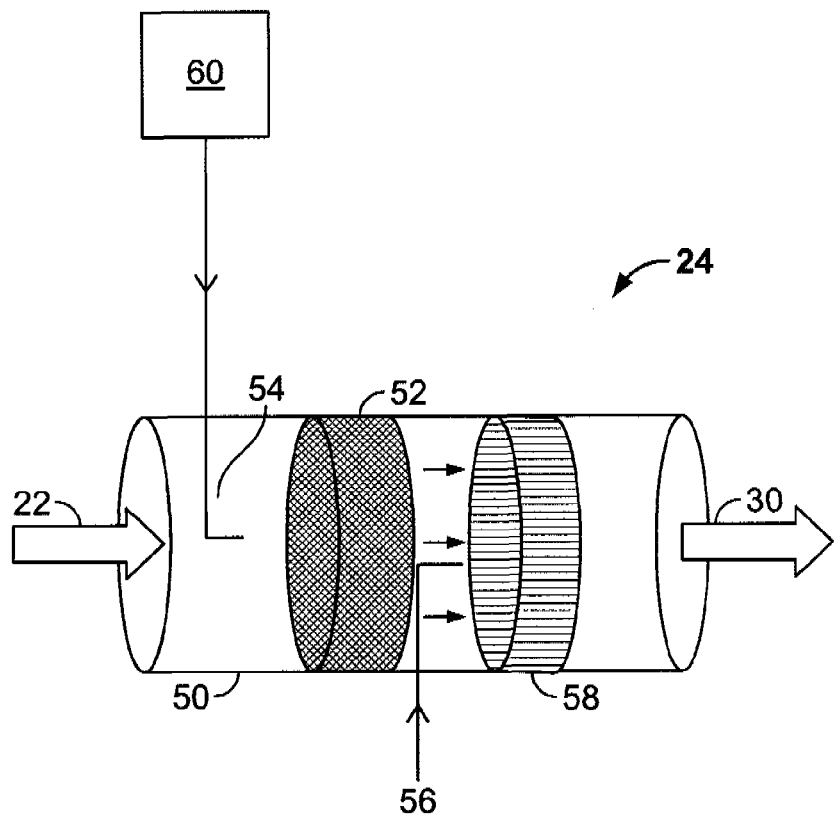
FIG. 2 is a schematic view of an exemplary selective catalyst reduction (SCR) device.

FIG. 2 is a schematic view of catalytic bed 24. In the exemplary embodiment, catalytic bed 24 includes a body 50 that supports a first catalytic bed 52. Catalytic bed 24 also includes a first injection port 54 positioned upstream of a first SCR catalytic bed 52. First injection port 54 penetrates body 50 and is formed as an injection tree, injection ring header or any other injection device configured to inject a flow of mercury oxidizer into a stream of exhaust gas. As used herein, a mercury oxidizer relates to an ion in solution or compound that combines with a mercury atom. Catalytic bed 24 includes a second injection port 56 that penetrates body 50. Second injection port 56 is positioned downstream of first SCR catalytic bed 52 and upstream of a second catalytic bed assembly including an ammonia oxidation catalytic bed 58. Second injection port 56 is formed as an injection tree, injection ring header or any other injection device configured to inject a flow of mercury oxidation catalyst into a stream of exhaust gas. Ammonium oxidation catalyst bed 58 is immediately downstream of first SCR catalyst bed 52. Combustion exhaust gas 22 entering catalytic bed 24 is treated and discharged as conditioned combustion exhaust gas 30.

An oxidizing agent sub-system 60 is coupled in flow communication with catalytic bed 24 via first injection port 54. Sub-system 60 facilitates formation of and injection of a Hg oxidizer into the stream of exhaust gas. The Hg oxidizer may include, but not be limited to, ammonia chloride solution ($NH_4Cl$) as discussed further below.

In operation, catalytic bed 24 facilitates a reducing reaction of nitrogen oxides and/or an oxidation reaction of mercury within the flow of combustion exhaust gas 22. In one embodiment, the stream of combustion exhaust gas 22 includes combustion products including, but not limited to, carbon monoxide, water, hydrogen, nitrogen and/or mercury. Combustion exhaust gas 22 enters catalytic bed 24 and a flow of mercury oxidizer is injected into the stream of exhaust gas 22 by first injection port 54. Combustion exhaust gas 22 passes through first SCR catalytic bed 52 and a flow of a mercury oxidation catalyst is injected into the stream of exhaust gases by second injection port 56. Combustion exhaust gas 22 flows through ammonium oxidation catalyst bed 58 and then exits catalytic bed 24 as conditioned combustion exhaust gas 30.

The stream of combustion exhaust gas 22 is directed through catalytic bed 24 to reduce $NO_x$ contained in the combustion gas. Within catalytic bed 24, $NO_x$ is reduced to nitrogen and oxygen. In one embodiment, a suitable quantity of ammonia is injected at first injection port 54 into the stream of combustion exhaust gas 22 before or as the gas enters first SCR catalyst bed 52. The injected ammonia facilitates the conversion of $NO_x$ to nitrogen and oxygen. In this embodiment, first SCR catalyst bed 52 includes a plurality of monolith bricks. Each brick is coated or lined with a catalyst suitable for catalyzing the reduction of $NO_x$ as combustion exhaust gas 22 flows across the surface area of the bricks. The bricks are fabricated from an extruded ceramic material and coated with a suitable catalyst material known to those skilled in the art. In alternative embodiments, first SCR catalyst bed 52 includes bricks fabricated from any suitable material and/or having any suitable configuration known to those skilled in the art.

In an alternative embodiment, ammonia oxidation catalytic bed 58 includes a wash coat mercury (Hg) oxidation catalyst and an $NH_3$ slip oxidation catalyst. Combustion exhaust gases 22 are channeled through the wash coat mercury (Hg) oxidation catalyst and $NH_3$ slip oxidation catalyst and/or combustion gas outlet exhaust duct 20. A controllable quantity of ammonium halide is injected into the combustion gas exhaust duct 20 to interact with the combustion gas flowing through the combustion gas exhaust duct 20. The conditioned combustion exhaust gases 30 exit catalytic bed 24 and enter ESP 28.

Figure 3:
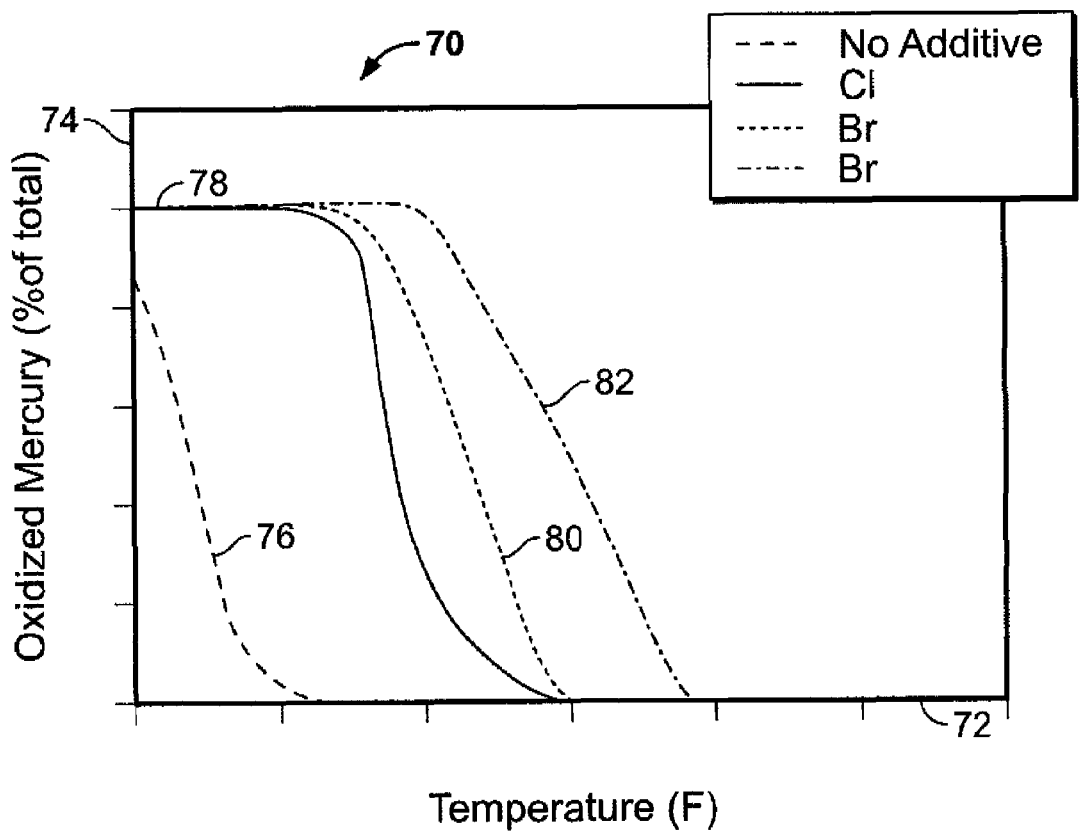
FIG. 3 is a graph illustrating exemplary traces relating temperature to percent of total of oxidized mercury in flue gas for typical combustion conditions.

FIG. 3 is a graph 700 illustrating exemplary traces relating temperature to percent of total of oxidized mercury in flue gas for typical combustion conditions. Specifically, in the exemplary embodiment, predictions of the equilibrium modeling on the effects of mercury oxidation involving the injection of Cl and Br in flue gas of a Powder River Basin (PRB) coal for typical combustion conditions are graphically illustrated. Within graph 70, an x-axis 72 is graduated in increments of temperature and a y-axis 74 is graduated in units of oxidized mercury concentration percent level. As denoted in the legend, graph 70 illustrates line symbol concentrations of no additive, Cl 3 ppm, Br 3 ppm and Br 0.3 ppm in the flue gas for typical combustion conditions. A first trace 76 represents the concentration of chlorine in flue gas without additive injection. A second trace 78 represents the concentration of chlorine in flue gas with a Cl 3 ppm additive. A third trace 80 represents the concentration of chlorine in flue gas with a Br 0.3 ppm additive. Also, a fourth trace 82 is representative of the concentration of chlorine in flue gas with a Br 3 ppm additive.

Process modeling suggests that within the first trace 76 without halogen, mercury oxidation takes place in the temperature range of about 204 degrees Celsius (° C.) (400 degrees Fahrenheit (° F.)) to 316° C. (600° F.). FIG. 3 shows second trace 78 and fourth trace 82 and that in the presence of halogens, mercury oxidation takes place at higher temperatures in the temperature range of about 371° C. (700° F.) and 538° C. (1000° F.) for second trace 78 and in the temperature range of about 482° C. (900° F.) and 649° C. (1200° F.) for the fourth trace 82, suggesting that Hg oxidation is more effective in the presence of halogens. In addition, traces 78 and 82 also suggest that bromine is a more effective oxidizing agent than chlorine. Notably, mercury oxidation in the presence of bromine occurs in the temperature range of about 427° C. (800° F.) and 538° C. (1000° F.). Third trace 80 illustrates that it takes less bromine in flue gas to achieve the same effect as may be produced by chlorine, as shown in trace 78.

In one embodiment, an ammonium halide compound ($NH_4Cl$, $NH_4Br$, or $NH_4I$) is injected upstream of first SCR catalyst bed 52 (shown in FIG. 2) from sub-system 60 via first injection port 54. Specifically, ammonium halide can be injected upstream of catalyst bed 24 (shown in FIG. 2), or can be injected through a combined SCR/ammonia oxidation catalyst staged after first SCR catalyst bed 52. When the additive is injected upstream of catalyst bed 24, ammonium halide decomposes on the catalyst producing $NH_{4+}$ and Cl- ions. The $NH_{4+}$ and Cl- ions then oxidize Hg on the SCR catalyst. When an ammonia oxidation catalyst 58 is employed, the SCR catalyst will perform catalytic decomposition of the ammonium chloride to $NH_{4+}$ and Cl- along with reduction of $NO_x$ to $N_2$ and $O_2$. The increase in $NH_{4+}$ ion concentration enhances the efficiency of the SCR and ammonia oxidation catalyst 58. The increase in Cl- concentration enhances the efficiency of the mercury oxidation at the ammonia oxidation catalyst. A further enhancement in the efficiency of Hg oxidation by adding a mercury oxidation catalyst into the ammonia oxidation catalyst catalyzes the Hg oxidation reaction in the presence of Cl- concentration. The oxidation of mercury by Cl- enhances the Hg capture efficiency by Hg removal technology. In addition to $NH_4Cl$ solution, depending upon the temperature of the injection zone, the solution or slurry of the following candidate compounds can also be injected for Hg control before the SCR catalyst: $CaCl_2$, $CaBr_2$, $MgCl_2$, $MgBr_2$, NaCl, NaBr, KCl and KBr.

The following is a detailed four step chemical description:

Step 1). The $NH_4Cl$ solution is formed within sub-system 60 by mixing dilute HCl solution into $NH_3$ solution:

$$HCl + NH_4OH = NH_4Cl + H_2O$$

or by mixing the $NH_4Cl$ salt into the $NH_3$-water solution. In other embodiments, HBr or $NH_4Br$ (or HI or $NH_4I$) are potential mixing choices if economical sources of HBr/$NH_4Br$, or HI/$NH_4I$ are available in the local geographic area.

Step 2). The decomposition of $NH_4Cl$ into $NH_{4+}$ and Cl- on the SCR catalyst.

Step 3). The oxidation of elemental $Hg_0$ with Cl- to $Hg_{2+}$ over the ammonia oxidation catalyst.

The in-situ decomposition of $NH_4Cl$ to $NH_{4+}$ on the SCR catalyst surface could enhance the main $NO_x$ SCR reaction:

Step 4). $4NO + 4NH_3 + O_2 = 4N_2 + 6H_2O$

The method provides a means of reducing mercury emissions using a catalytic bed 24 including at least a first SCR catalyst bed 52 wherein injecting a flow of a compound including ammonia and a first mercury oxidizer includes injecting a flow of an ammonium halide compound. Also, the method of injecting a flow of ammonium halide compound includes injecting a flow of at least one of ammonia chloride, ammonia bromide, or ammonia iodide and injecting a flow of ammonium halide compound includes injecting a mixture of at least one of ammonia chloride, ammonia bromide, and ammonia iodide with at least one of urea and NH3 solution. The method further includes injecting a second mercury oxidizer flow including at least one of $CaCl_2$, $CaBr_2$, $MgCl_2$, $MgBr_2$, NaCl, NaBr, KCl, and KBr upstream of first SCR catalytic bed 52. The method also includes injecting a second mercury oxidizer when a temperature of combustion exhaust gas 22 is between about 371° C. (700° F.) and 649° C. (1200° F.). More specifically, a second mercury oxidizer is injected when a temperature of combustion exhaust gas 22 is between about 482° C. (900° F.) and 649° C. (1200° F.). More specifically still, the second mercury oxidizer is injected when a temperature of combustion exhaust gas 22 is between about 427° C. (800° F.) and 538° C. (1000° F.).

The method also reduces mercury emissions using a catalytic bed 24 including at least a first SCR catalytic bed 52 and an ammonia oxidation catalyst bed 58. The method includes injecting a mercury oxidation catalyst upstream of ammonia oxidation catalyst bed 58. The efficiency of at least one of ammonia oxidation catalytic bed 58 and first SCR catalytic bed 58 is enhanced by decomposing ammonium chloride to ammonia ions and chloride ions and reducing nitrogen oxides to nitrogen and water using the ammonia ions. Also in a further embodiment, at least one of fly ash and active carbon particles are injected in the flow of combustion exhaust gas 22 to enhance the mercury capture efficiency.

In another aspect, the method includes the application of ammonia chloride, ammonia bromide, or ammonia iodide upstream of the SCR mixed with urea or $NH_3$ solution. These compounds, via chemical reaction on the SCR catalyst, breakdown to their constituent ions. The $NH_{4+}$ ions effectively reduce the $NO_x$ concentration in the flue gas while the halogen ions effectively oxidize the HgO to $Hg_{2+}$. The oxidation of HgO to $Hg_{2+}$ allows for greater mercury capture in existing emission control devices or via activated carbon injection.

The method increases the efficiency of mercury removal via fly ash, activated carbon, wet scrubber or other Hg control technology by oxidizing Hg by the injection of an ammonium halide compound ($NH_4Cl$, $NH_4Br$, or $NH_4I$) upstream of first SCR catalyst bed 52, In one embodiment, the ammonium halide is injected upstream of catalytic bed 24. In an alternative embodiment, the ammonium halide is injected upstream of combined SCR/ammonia oxidation catalyst staged after first SCR catalytic bed 52. When the additive is injected upstream of catalytic bed 24, ammonium halide decomposes on the catalyst producing $NH_{4+}$ and Cl- ions. Hg is then oxidized on the SCR catalyst. When an SCR/ammonia oxidation catalyst is employed, the SCR catalyst performs catalytic decomposition of the ammonium chloride to $NH_{4+}$ and Cl- along with reduction of $NO_x$ to $N_2$ and $O_2$. The increase in $NH_{4+}$ ion concentration enhances the efficiency of first SCR catalytic bed 52 and ammonia oxidation catalyst bed 58.

In an alternative embodiment, catalytic bed 24 includes an ammonia oxidation catalyst bed 58 including a wash coat mercury (Hg) oxidation catalyst and an $NH_3$ slip oxidation catalyst. Upstream of the wash coat mercury (Hg) oxidation catalyst and $NH_3$ slip oxidation catalyst system, a suitable quantity of at least one of fly ash or active carbon particles is injected into the flue gas and mixed with the flue gas including particulate matter. The oxidation of $Hg_0$ by Cl- can enhance the Hg capture efficiency by at least one of fly ash or active carbon particles injected into the flue gas for Hg control in the wash coat mercury (Hg) oxidation catalyst and $NH_3$ slip oxidation catalyst.

In an alternative embodiment, the flow of combustion exhaust gas 22 flow is channeled through the wash coat mercury (Hg) oxidation catalyst and $NH_3$ slip oxidation catalyst and/or combustion gas outlet exhaust duct 17. A controllable quantity of ammonium halide is injected into combustion gas exhaust duct 20 to interact with the combustion gas flowing through combustion gas exhaust duct 20. The conditioned combustion exhaust gas 30 exits catalytic bed 24 and enters ESP 28.

Figure 4:
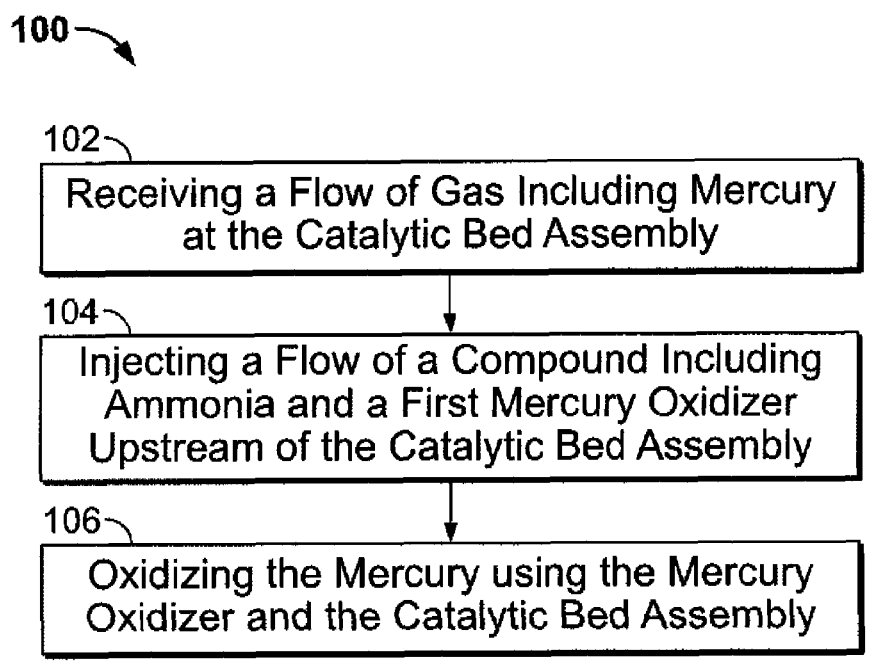
FIG. 4 is a block diagram of an exemplary method that may be used to facilitate reducing mercury emissions using a selective catalyst reduction (SCR) device.

FIG. 4 is a block diagram of an exemplary method 100 for reducing mercury emissions using a catalytic bed 24. Method 100 includes receiving 102 a flow of gas including mercury at the catalytic bed assembly. Method 100 also includes injecting 104 a flow of compound including ammonia and a first mercury oxidizer upstream of the catalytic bed assembly 104. In addition, method 100 includes oxidizing 106 the mercury using the mercury oxidizer and catalytic bed assembly.

The above-described method and system facilitates the continuous removal of mercury and oxides of nitrogen ($NO_x$) from a supply of combustion gas in a cost-effective and reliable manner. More specifically, the method and system of the present invention monitor and adjust the introduction of materials, such as an ammonium halide compound/or $NH_4Cl$ solution. Depending upon the temperature of the injection zone, a solution containing one or more of the following candidate compounds is also injected for Hg control before the SCR catalyst. The compounds include $CaCl_2$, $CaBr_2$, $MgCl_2$, $MgBr_2$, NaCl, NaBr, KCl and KBr. A determination of which compounds to include is based, for example, on an absorption rate of mercury within the system. As a result, the method and system is a cost-effective and reliable method for reducing mercury emissions.

Exemplary embodiments of a method and system for continuously removing mercury and oxides of nitrogen ($NO_x$) from a supply of combustion gas are described above in detail. The method and system are not limited to the specific embodiments described herein, but rather, steps of the method and/or components of the system may be utilized independently and separately from other steps and/or components described herein. Further, the described method steps and/or system components can also be defined in, or used in combination with, other methods and/or systems, and are not limited to practice with only the method and system described herein.

While the invention has been described in terms of various specific embodiments, those skilled in the art will recognize that the invention can be practiced with modification within the spirit and scope of the claims.

What is claimed is:

1. A method of reducing mercury in a fluid stream using a catalytic bed assembly including at least a first catalytic bed, said method comprising:
    receiving a flow of fluid including mercury at the catalytic bed assembly, wherein the catalytic bed assembly also includes an ammonia oxidation catalyst bed;
    injecting a mercury oxidation catalyst upstream from the ammonia oxidation catalyst bed;
    injecting a flow of a compound including ammonia and a first mercury oxidizer upstream of the first catalytic bed;
    injecting a flow of a second mercury oxidizer upstream of the catalytic bed assembly; and
    oxidizing the mercury using the mercury oxidizer and the catalytic bed assembly.

2. A method in accordance with claim 1 wherein injecting a flow of a compound comprises injecting a flow of an ammonium halide compound.

3. A method in accordance with claim 1 wherein injecting a flow of a compound comprises injecting a flow of at least one of ammonia chloride, ammonia bromide, or ammonia iodide.

4. A method in accordance with claim 1 wherein injecting a flow of a compound comprises injecting a mixture of at least one of ammonia chloride, ammonia bromide, and ammonia iodide with at least one of urea and $NH_3$ solution.

5. A method in accordance with claim 1 wherein injecting a flow of a second mercury oxidizer comprises injecting at least one of $CaCl_2$, $CaBr_2$, $MgCl_2$, $MgBr_2$, NaCl, NaBr, KCl, and KBr upstream of the catalytic bed assembly.

6. A method in accordance with claim 5 wherein injecting a second mercury oxidizer comprises injecting the second mercury oxidizer when a temperature of the flow of fluid is between about 371° C. (700° F.) and 649° C. (1200° F.).

7. A method in accordance with claim 5 wherein injecting a second mercury oxidizer comprises injecting the second mercury oxidizer when a temperature of the flow of fluid is between about 482° C. (900° F.) and 649° C. (1200° F.).

8. A method in accordance with claim 5 wherein injecting a second mercury oxidizer comprises injecting the second mercury oxidizer when a temperature of the flow of fluid is between about 427° C. (800° F.) and 538° C. (1000° F.).

9. A method in accordance with claim 1 further comprising increasing the efficiency of at least one of the ammonia oxidation catalytic bed and the first catalytic bed by decomposing ammonium chloride to ammonia ions and chloride ions and reducing nitrogen oxides to nitrogen and water using the ammonia ions.

10. A method in accordance with claim 1 further comprising injecting at least one of fly ash and active carbon particles in the flow of fluid.

11. A method of reducing mercury in a fluid stream using a catalytic bed assembly including at least a first catalytic bed, said method comprising:
    receiving a flow of fluid including mercury at the catalytic bed assembly;
    injecting at least one of fly ash and active carbon particles in the flow of fluid;
    injecting a flow of a compound including ammonia and a first mercury oxidizer upstream of the first catalytic bed;
    injecting a flow of a second mercury oxidizer upstream of the catalytic bed assembly; and
    oxidizing the mercury using the mercury oxidizer and the catalytic bed assembly.

12. A method of reducing mercury in a fluid stream using a catalytic bed assembly including at least a first catalytic bed, said method comprising:
- receiving a flow of fluid including mercury at the catalytic bed assembly, wherein the catalytic bed assembly also includes an ammonia oxidation catalyst bed;
- injecting a mercury oxidation catalyst upstream of the ammonia oxidation catalyst bed;
- injecting a flow of a compound including ammonia and a first mercury oxidizer upstream of the first catalytic bed;
- injecting a flow of a second mercury oxidizer upstream of the catalytic bed assembly;
- oxidizing the mercury using the mercury oxidizer and the catalytic bed assembly; and
- increasing the efficiency of at least one of the ammonia oxidation catalytic bed and the first catalytic bed by decomposing ammonium chloride to ammonia ions and chloride ions and reducing nitrogen oxides to nitrogen and water using the ammonia ions.

13. A method of reducing mercury in a fluid stream using a catalytic bed assembly including at least a first catalytic bed, said method comprising:
- receiving a flow of fluid including mercury at the catalytic bed assembly;
- injecting a flow of a compound including ammonia and a first mercury oxidizer upstream of the first catalytic bed;
- injecting a flow of a second mercury oxidizer upstream of the catalytic bed assembly, the second mercury oxidizer includes at least one of $CaCl_2$, $CaBr_2$, $MgCl_2$, $MgBr_2$, NaCl, NaBr, KCl, and KBr when a temperature of the flow of fluid is one of:
- between about 371° C. (700° F.) and 649° C. (1200° F.);
- between about 482° C. (900° F.) and 649° C. (1200° F.); and
- between about 427° C. (800° F.) and 538° C. (1000° F.); and
- oxidizing the mercury using the mercury oxidizer and the catalytic bed assembly.

* * * * *